March 26, 1968

C. SEIPPEL 3,374,942

ROTARY PRESSURE TRANSFORMER

Filed Aug. 8, 1966

INVENTOR.
Claude Seippel
BY
Pierce, Scheffler & Parker
ATTORNEYS

United States Patent Office 3,374,942
Patented Mar. 26, 1968

3,374,942
ROTARY PRESSURE TRANSFORMER
Claude Seippel, Zurich, Switzerland, assignor to Aktiengesellschaft Brown, Boveri & Cie, Baden, Switzerland, a joint-stock company
Filed Aug. 8, 1966, Ser. No. 571,012
Claims priority, application Switzerland, Aug. 12, 1965, 11,353/65
8 Claims. (Cl. 230—69)

The present invention relates to the art of pressure transformers or converters which serve to compress a gas from a lower to a higher pressure and at the same time to expand another gas, or the same gas, in a different state, between the same or between other pressure levels. The expansion work furnishes the energy for the compression. The machine therefore combines the function of a compressor with the function of an expansion turbine coupled with it. It finds application in charging processes, combustion turbines and the like. The pressure transformer consists of a rim of oblong channels or cells, in which energy conversions are produced by periodic opening and closing of the cell ends, the cell end being brought into communication alternatively with the inflow and outflow of the gases. Upon opening and closing of the cell ends there result compression or rarefaction waves, which pass through the cells and bring about the desired energy conversions.

The cells are always arranged in a circle. Either their total number forms a rotor, whose rotation in a system of fixed channels brings about the desired opening and closing of the cells, the so-called "sluicing." Or the cell rim is fixed and the sluicing is brought about by the rotation of distributors.

In the known designs of such machines, the cells consist of straight or helical channels of a sector-shaped cross-section constant over the entire length. The invention is based on the realization that by a certain design of the cell ends the process can be improved. The improvement proceeds in two directions:

(1) A source of loss is caused by the non-sudden opening and closing of the cell ends, as would in itself be desirable. The sluicing times are determined by the circumferential speed of the relative movement between cells and control channels and by the width of the cells in circumferential direction. This width, and hence the control time, can be reduced by pushing the cell ends together in circumferential direction, enlarging them by compensation perpendicularly thereto. One thus obtains a very flat cross-section. If this were to be maintained over the entire length, it would be very disadvantageous because of the friction of the gas on the walls. According to the invention, therefore, only the ends are flattened, while in its remaining length the channel is so shaped that it is favorable in terms of flow, for example circular, which is advantageous also for reasons of strength.

(2) In the cells, speeds prevail which are in a certain relation to the desired pressure conditions and may assume high values. These speeds must be generated and reduced again, which has heretofore been done in the channels outside the cells. By a trumpet type enlargement of the cell channel at the entrance and at the exit, the velocity conversion is in part shifted into the interior of the cells. This, it is true, results in a certain distortion of the compression and rarefaction wave fronts to be generated. This coincides with the above-mentioned distortion by the finite control time, but the effects are not cumulative, so that the advantage of low-loss velocity variation predominates.

The invention thus consists in that the cells, with the exception of the ends, present a cross-section favorable in terms of flow, e.g. a circular one, and are constricted at both ends in circumferential direction, while being enlarged perpendicularly thereto. An additional advantage is obtained when the cells are enlarged at both ends in trumpet fashion, and the enlargement along one axis thus outweighs the constriction normal thereto. The invention permits improvement of the efficiency of the machine or, if this is necessary for reasons of strength, reduction of the circumferential speed.

The foregoing objects, as well as other objects and advantages inherent in the improved construction of the pressure transformer will become more apparent from the following description of different, representative embodiments thereof, and from the accompanying drawings wherein.

Figure 1:
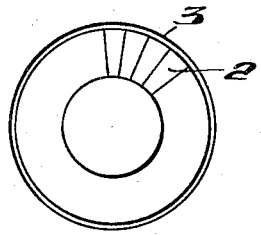
FIGS. 1 and 2 are transverse and longitudinal sectional views respectively of a pressure transformer of known construction and which have been included for purposes of background information.
Figure 2:
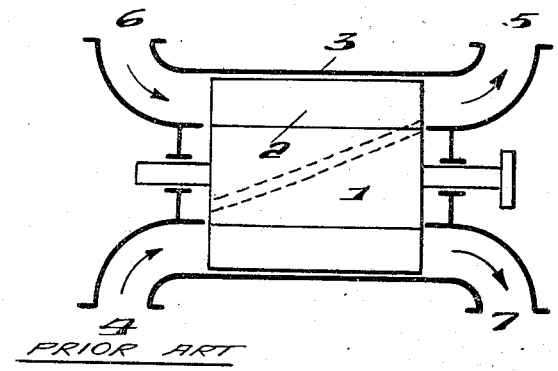

With reference now to the drawings, and to FIGS. 1 and 2 in particular, the conventional pressure transformer is seen to be of the type wherein the rim of cells 2 are mounted on a rotor 1 for rotation within a housing 3. The stationary inlet and outlet connections 4 and 5, respectively, for the gas to be compressed are located at opposite ends of the rotor cells, and another set of stationary inlet and outlet connections 6 and 7, respectively, for the gas to be expanded are likewise located at opposite ends of the rotor cells. The cells 2 can be rectilinear and arranged parallel with the axis of the rotor, or they can be arranged helically about the rotor axis, as indicated diagrammatically by the dashed lines. The cells are of uniform cross-section throughout their length.

In the improved pressure transformer shown in FIGS. 3–5a and wherein the cells are also arranged on the rotor element of the machine, cells 10 and 11 are seen to be circular, except for their opposite end portions, and are located on the rotor in two circular rows. The cells 10 have their centers located along the arc of an inner circle $x$, and the cells 11 have their centers located along the arc of an outer circle $y$. The cells 10 along the inner circle are contiguous while the cells 11 are spaced from one another in the circumferential direction with their centers located on radii which pass through the point of tangency of adjacent cells 10.

Figure 3:
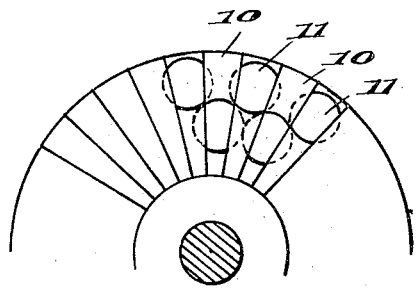
FIG. 3 is a front view of the rotor element of an improved pressure transformer in accordance with the present invention.
Figure 4:
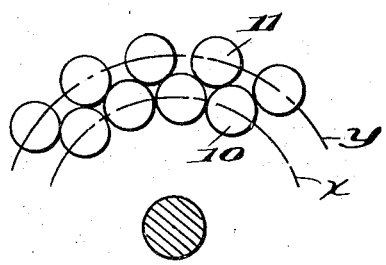
FIG. 4 is a section of rotor shown in FIG. 3 at the middle portion thereof.
Figure 5:
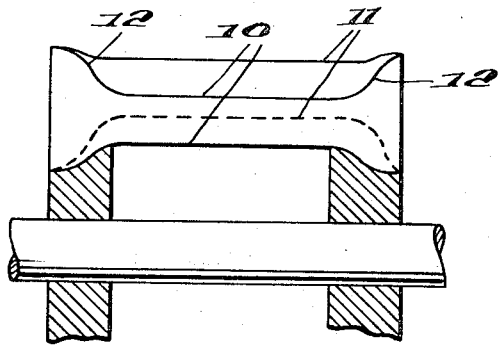
FIG. 5 is a half longitudinal section of the improved rotor.
Figure 5A:
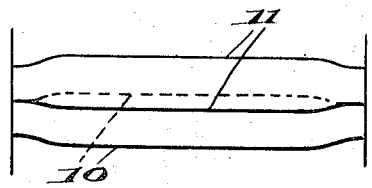
FIG. 5a is a top view of some of the cells on the rotor as viewed in the direction of the shaft axis.

In accordance with the invention the opposite end portions of the cells are constricted in a circumferential direction but enlarged perpendicular thereto. Thus, the opposite end portions of both groups of cells 10 and 11 become deformed from a circular configuration to a narrow circle sector 12, as shown in FIG. 5, the inner and outer cells inserting themselves alternately into the same ring surface, as can be seen in FIG. 3. The cross-section of the sector-shaped cell ends 12 is somewhat greater than that of the circular, middle portions of the cells. An additional advantage obtains when the cross section of the cells enlarges at both ends in a trumpet fashion and hence the enlargement of the cell end along one axis out-weighs the constriction normal thereto.

Figure 6:
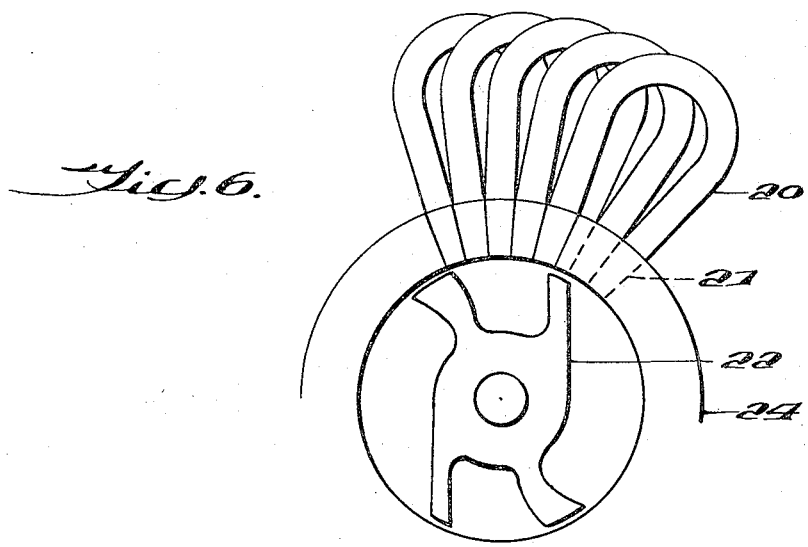
FIG. 6 is an end view of a modified construction wherein the pressure exchanging cells are stationary rather than rotary as in the embodiment of FIGS. 3–5, and wherein a rotary distributor is used to conduct the gases into and out of the cells.
Figure 7:
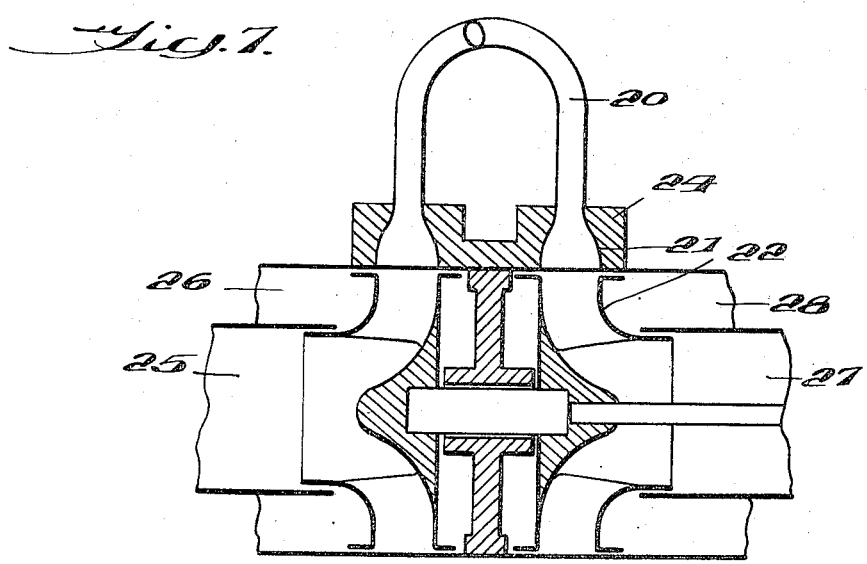
FIG. 7 is a longitudinal sectional view of the cell arrangement shown in FIG. 6.

FIGS. 6 and 7 illustrate a considerably different embodiment of the invention wherein the cells are arranged so as to be stationary, and the sluicing processes incidental to getting the gases into and out of the cells are controlled by a rotating distributor, the inflow and outflow of the gases relative to the cells occurring in a radial direction. In this modified embodiment, the arc-shaped cell channels are indicated at 20. These cells have a circular cross-section except at their opposite end portions 21 which, in accordance with the invention, are constricted in a circumferential direction but are widened in the axial direction. The rotating distributor is indicated at 22 and the housing for the machine is designated 24.

The inflow channel to the rotary distributor 22 for the gas to be expanded is indicated at 25 for this is seen to be bifurcated in the distributor. The inflow channel 26 to the rotary distributor for the gas to be compressed surrounds inflow channel 25 at the same side of the rotary distributor and is likewise bifurcated. At the opposite side of the rotary distributor are the bifurcated outflow channels 27 and 28 for the gases to be expanded and compressed, one of which likewise surrounds the other. With this embodiment of the invention, two compression and expansion cycles are completed per circumference.

I claim:

1. In a rotary pressure transformer comprising a circular array of elongated cells in which energy conversions accompanied by compression and rarefaction waves are produced by opening and closing of the cell ends in rotation in conjunction with connection of the cell ends when opened with gas inflow and outflow channels, the improvement wherein said cells except for the opposite end portions thereof have a cross-section favorable to the flow of the gas, and said end portions of said cells are constricted in a circumferential direction and enlarged in a direction perpendicularly thereto.

2. A rotary pressure transformer as defined in claim 1 wherein said cells except for said end portions thereof have a circular cross-section.

3. A rotary pressure transformer as defined in claim 1 wherein the end portions of said cells are enlarged in trumpet fashion such that the enlargement along one axis out-weighs the constriction perpendicularly thereto.

4. A rotary pressure transformer as defined in claim 1 wherein said cells are arranged in concentric circular rows with the cells of said inner row contiguous to one another and with the cells of said outer row spaced from each other such that the center of each cell of said outer row lies along a radii tangent with the contiguous surfaces of a pair of adjacent cells of said inner row.

5. A rotary pressure transformer as defined in claim 4 wherein said cells except for the end portions thereof have a circular cross-section.

6. A rotary pressure transformer as defined in claim 4 wherein the end portions of the cells of the inner and outer rows, which cells are otherwise of circular cross-section, have a cross-section of a narrow circle sector, and wherein the cells of the inner and outer rows are inserted alternately into the same ring surface.

7. A rotary pressure transformer as defined in claim 1 wherein said cells are mounted on a rotary element, and said gas inflow and outflow channels leading to the end portions of said cells are stationary.

8. A rotary pressure transformer as defined in claim 1 wherein said cells are mounted so as to be stationary, and said gas inflow and outflow channels leadings to the end portions of said cells are mounted on a rotary distributor.

References Cited

UNITED STATES PATENTS

| 2,764,340 | 9/1956 | Jendrassik | 230—69 |
|---|---|---|---|
| 2,780,405 | 2/1957 | Jendrassik | 230—69 |

FOREIGN PATENTS 840,408    7/1960    Great Britain.

ROBERT M. WALKER, *Primary Examiner.*